US012607220B2

(12) United States Patent
Babu

(10) Patent No.: US 12,607,220 B2
(45) Date of Patent: Apr. 21, 2026

(54) BASE RING ASSEMBLY FOR A PNEUMATIC VACUUM ELEVATOR AND A METHOD THEREOF

(71) Applicant: Killakathu Ramanathan Babu, Chennai (IN)

(72) Inventor: Killakathu Ramanathan Babu, Chennai (IN)

(73) Assignee: Killakathu Ramanathan Babu (IN)

( * ) Notice: Subject to any disclaimer, the term of this patent is extended or adjusted under 35 U.S.C. 154(b) by 510 days.

(21) Appl. No.: 18/273,996

(22) PCT Filed: May 31, 2021

(86) PCT No.: PCT/IB2021/054742
§ 371 (c)(1),
(2) Date: Jul. 25, 2023

(87) PCT Pub. No.: WO2022/175730
PCT Pub. Date: Aug. 25, 2022

(65) Prior Publication Data
US 2024/0418205 A1 Dec. 19, 2024

(30) Foreign Application Priority Data
Feb. 16, 2021 (IN) .............................. 202141006515

(51) Int. Cl.
*F16B 39/282* (2006.01)
*B66B 9/04* (2006.01)
(Continued)

(52) U.S. Cl.
CPC .............. *F16B 39/282* (2013.01); *B66B 9/04* (2013.01); *F16B 39/30* (2013.01); *F16B 39/34* (2013.01)

(58) Field of Classification Search
CPC .......... B66B 9/04; F16B 39/282; F16B 39/30; F16B 39/34; F16J 15/067
See application file for complete search history.

(56) References Cited

U.S. PATENT DOCUMENTS

| | | | | |
|---|---|---|---|---|
| 5,181,807 A | * | 1/1993 | Anders | .................. B65G 51/06 406/190 |
| 5,447,211 A | * | 9/1995 | Sors | .......................... B66B 9/04 187/277 |

(Continued)

FOREIGN PATENT DOCUMENTS

| | | | | |
|---|---|---|---|---|
| CN | 103863918 B | * | 7/2016 | |
| CN | 104787645 B | * | 6/2018 | ............... B66B 9/04 |

(Continued)

*Primary Examiner* — Minh Truong
*Assistant Examiner* — Michelle M Mudwilder
(74) *Attorney, Agent, or Firm* — Jason C. Cameron

(57) ABSTRACT

A base ring assembly is disclosed. The base ring assembly an arc shaped base ring includes at least four parts. The arc shaped base ring is composed by an aluminum die casting. The base ring assembly also includes an L-shaped clamp comprises at least four parts. The at least four parts of the L-shaped clamp are located on grooves of the corresponding at least four parts of the arc shaped base ring. The L-shaped clamp is configured to hold a rubber beading rib of an external cylinder assembly. The base ring assembly further includes at least four connectors and a corresponding one or more rivet nuts configured to couple the at least four parts of the arc shaped base ring with each other to create a full round base ring. The base ring assembly further includes a plurality of fasteners configured to affix the arc shaped base ring with L-shaped clamp.

11 Claims, 11 Drawing Sheets

(51) Int. Cl.
    *F16B 39/30*           (2006.01)
    *F16B 39/34*           (2006.01)

(56)                 References Cited

U.S. PATENT DOCUMENTS

| | | | | |
|---|---|---|---|---|
| 5,490,758 | A * | 2/1996 | Stone | B66F 7/08 |
| | | | | 414/495 |
| 5,583,326 | A * | 12/1996 | Sors | B66B 9/04 |
| | | | | 187/277 |
| 9,248,995 | B2 * | 2/2016 | Ascua | F16K 7/14 |
| 10,233,055 | B1 * | 3/2019 | Ascua | B66B 11/026 |
| 10,351,388 | B2 * | 7/2019 | Ascua | B66B 9/04 |
| 11,414,302 | B1 * | 8/2022 | De Ledebur | B66B 19/00 |
| 11,518,653 | B2 * | 12/2022 | De Ledebur | B66B 19/00 |
| 11,919,743 | B2 * | 3/2024 | Darnley, III | B66B 11/0206 |
| 12,110,208 | B2 * | 10/2024 | Alexanian | B32B 17/10119 |

FOREIGN PATENT DOCUMENTS

| | | |
|---|---|---|
| EP | 3498651 A2 | 6/2019 |
| IN | 20204102308 | 6/2020 |

* cited by examiner

70

20

20

340

350

360

10

10

400

410

10

Landing lever 20
440
450

460

500

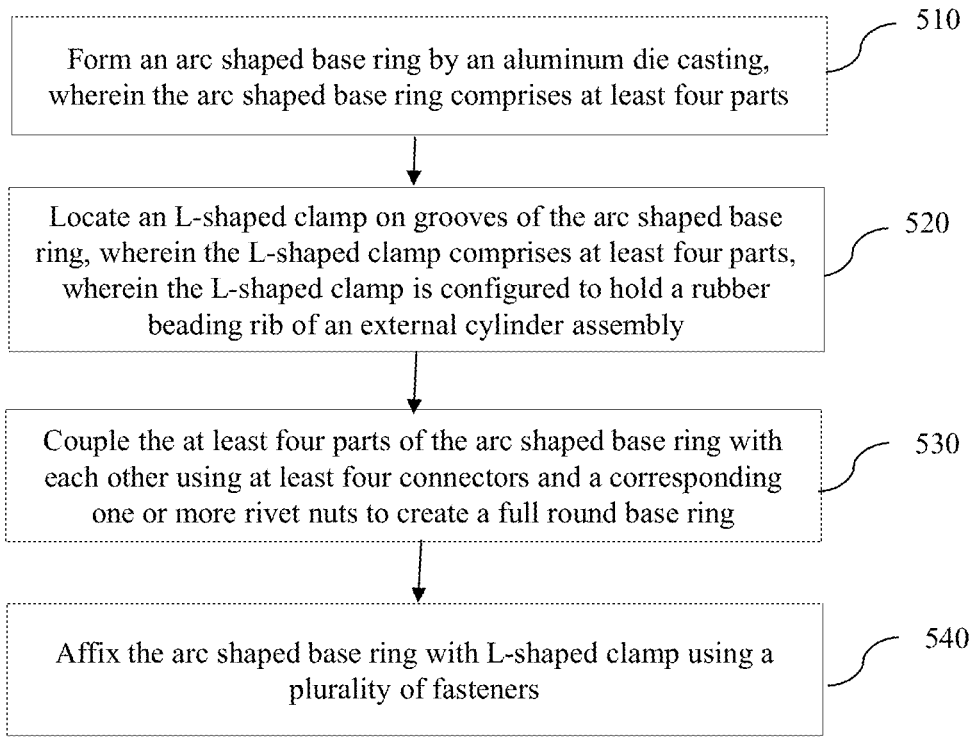

Form an arc shaped base ring by an aluminum die casting, wherein the arc shaped base ring comprises at least four parts — 510

Locate an L-shaped clamp on grooves of the arc shaped base ring, wherein the L-shaped clamp comprises at least four parts, wherein the L-shaped clamp is configured to hold a rubber beading rib of an external cylinder assembly — 520

Couple the at least four parts of the arc shaped base ring with each other using at least four connectors and a corresponding one or more rivet nuts to create a full round base ring — 530

Affix the arc shaped base ring with L-shaped clamp using a plurality of fasteners — 540

FIG. 10

BASE RING ASSEMBLY FOR A PNEUMATIC VACUUM ELEVATOR AND A METHOD THEREOF

EARLIEST PRIORITY DATE

This Application claims priority from a Complete patent application filed in India having Patent Application No. 202141006515, filed on Feb. 16, 2021 and titled "A BASE RING ASSEMBLY FOR A PNEUMATIC VACUUM ELEVATOR AND A METHOD THEREOF, and PCT Application no. PCT/IB2021/054742 titled "A BASE RING ASSEMBLY FOR A PNEUMATIC VACUUM ELEVATOR AND A METHOD THEREOF" filed on May 31, 2021.

FIELD OF INVENTION

Embodiments of the present disclosure relates to a pneumatic vacuum elevator and more particularly to a base ring of an external cylinder assembly for a pneumatic vacuum elevator and a method thereof.

BACKGROUND

Pneumatic elevators use vacuum technology to power the platform between floors. Turbines at the top of the elevator shaft suck air out of the tube, which pulls the cabin upward. When the cabin reaches the desired level, the brakes secure it at the proper height. The pneumatic vacuum elevators are supported by various components for smooth movement of the cabin across the various floors. One such component is a base ring that is provided above and below a vertical pillar of the pneumatic vacuum elevator. Various base rings are available which integrates multiple external cylinder assemblies to extend height of the pneumatic vacuum elevator based on requirement.

One such type of conventional assembly includes manual bending and drilling process which is fixing between Aluminum vertical pillar and base ring. The conventional assembly also includes manual cutting process which is resting on the Aluminum vertical pillar and which is the rubber beading outer rib for door entrance. However, such improper assembling process of the base rings with various other components such as the external cylinder assemblies and one or more vertical connecting pillar generates an air gap. Also, such an air gap further causes improper functioning of the pneumatic vacuum elevator and causes unpleasant riding experience to the passenger.

Hence, there is a need for an improved base ring assembly for a pneumatic vacuum elevator to address the aforementioned issues.

BRIEF DESCRIPTION

In accordance with an embodiment of the present disclosure, a base ring assembly is provided. The base ring assembly includes an arc shaped base ring includes at least four parts. The arc shaped base ring is composed by an aluminum die casting. The base ring assembly also includes an L-shaped clamp comprises at least four parts. The at least four parts of the L-shaped clamp are located on grooves of the corresponding at least four parts of the arc shaped base ring. The L-shaped clamp is configured to hold a rubber beading rib of an external cylinder assembly. The base ring assembly further includes at least four connectors and a corresponding one or more rivet nuts configured to couple the at least four parts of the arc shaped base ring with each other to create a full round base ring. The base ring assembly further includes a plurality of fasteners configured to affix the arc shaped base ring with L-shaped clamp.

In accordance with another embodiment of the present disclosure, a method to assemble a base ring assembly is provided. The method includes forming an arc shaped base ring by an aluminum die casting, where the arc shaped base ring comprises at least four parts. The method also includes locating an L-shaped clamp on grooves of the arc shaped base ring, where the L-shaped clamp comprises at least four parts, where the L-shaped clamp is configured to hold a rubber beading rib of an external cylinder assembly. The method further includes coupling the at least four parts of the arc shaped base ring with each other using at least four connectors and a corresponding one or more rivet nuts to create a full round base ring. The method further includes affixing the arc shaped base ring with L-shaped clamp using a plurality of fasteners.

In accordance with yet another embodiment of the present disclosure, a pneumatic vacuum elevator is provided. The elevator includes an external cylinder assembly comprising an elevator cabin inserted therein. The elevator also includes a polycarbonate sheet configured to cover the external cylinder assembly. The elevator also includes a base ring assembly mechanically coupled to the polycarbonate sheet. The base ring assembly is configured to assist resting another external cylinder assembly one and above. The base ring assembly comprises an arc shaped base ring comprises at least four parts. The arc shaped base ring is composed by an aluminum die casting. The base ring assembly includes an L-shaped clamp comprises at least four parts. The at least four parts of the L-shaped clamp are located on grooves of the corresponding at least four parts of the arc shaped base ring. The L-shaped clamp is configured to hold a rubber beading rib of an external cylinder assembly. The base ring assembly further includes at least four connectors and a corresponding one or more rivet nuts configured to couple the at least four parts of the arc shaped base ring with each other to create a full round base ring. The base ring assembly also includes a plurality of fasteners configured to affix the arc shaped base ring with L-shaped clamp.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 10 is a flow chart representing the steps involved in a method 500 to assemble the base ring assembly in accordance with an embodiment of the present disclosure.

Figure 1A:
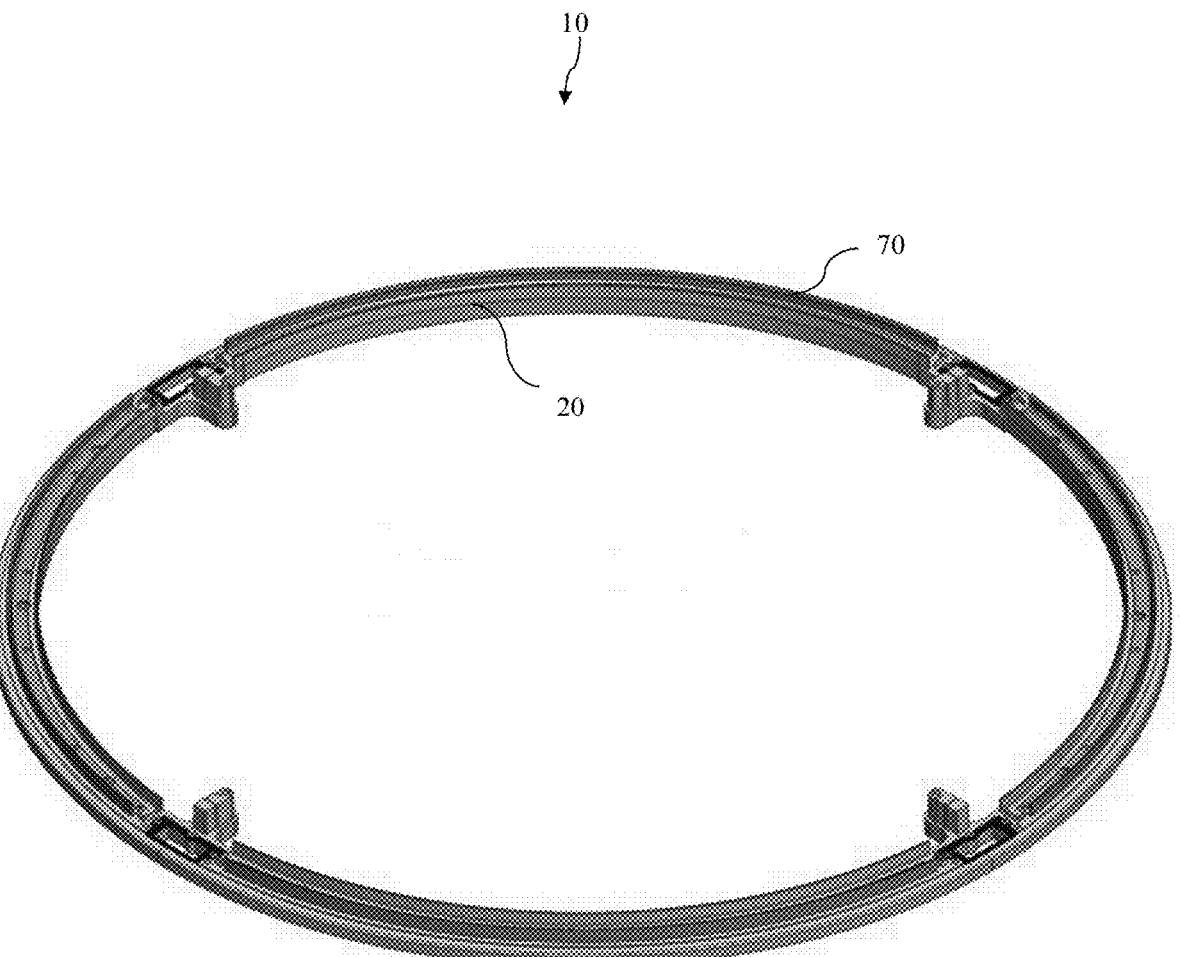
FIG. 1(*a*) and 1 (*b*) illustrates a schematic representation of an assembled isometric and exploded view of base ring assembly respectively in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a base ring assembly and a method thereof. The base ring assembly includes an arc shaped base ring includes at least four parts. The arc shaped base ring is composed by an aluminum die casting. The base ring assembly also includes an L-shaped clamp comprises at least four parts. The at least four parts of the L-shaped clamp are located on grooves of the corresponding at least four parts of the arc shaped base ring. The L-shaped clamp is configured to hold a rubber beading rib of an external cylinder assembly. The base ring assembly further includes at least four connectors and a corresponding one or more rivet nuts configured to couple the at least four parts of the arc shaped base ring with each other to create a full round base ring. The base ring assembly further includes a plurality of fasteners configured to affix the arc shaped base ring with L-shaped clamp.

Figure 1B:
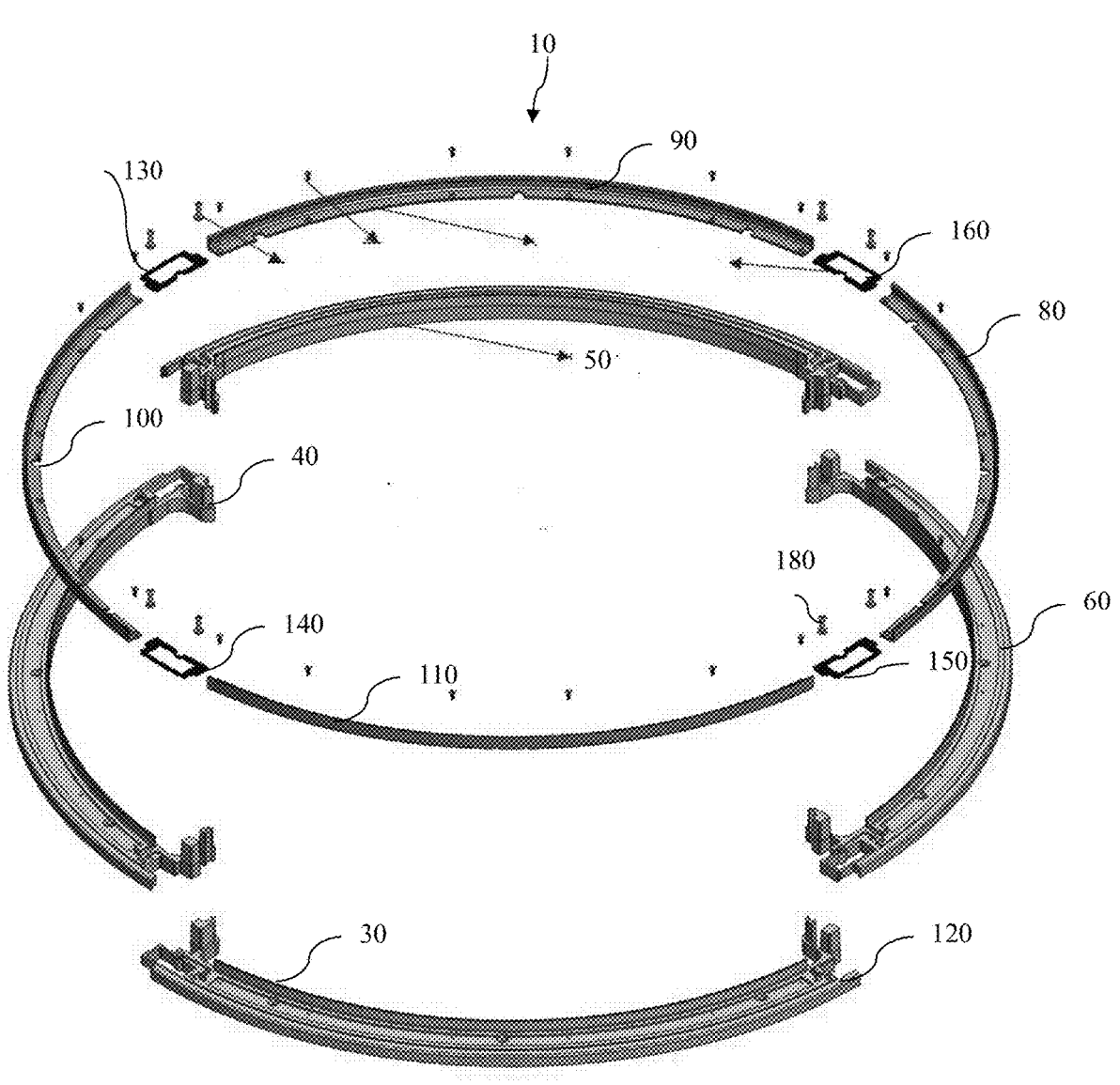

FIG. 1(*a*) and 1 (*b*) is a schematic representation of an assembled isometric and exploded view of base ring assembly respectively in accordance with an embodiment of the present disclosure. The base ring assembly 10 includes an arc shaped base ring 20 including at least four parts 30, 40, 50, 60. The arc shaped base ring 20 is composed by an aluminum die casting. The base ring assembly 10 also includes an L-shaped clamp 70 includes at least four parts 80, 90, 100, 110. The at least four parts of the L-shaped clamp are located on grooves 120 of the corresponding at least four parts of the arc shaped base ring. In one embodiment, the L-shaped clamp 70 is composed by the aluminum die casting. The L-shaped clamp is configured to hold a rubber beading rib of an external cylinder assembly. The base ring assembly 10 further includes at least four connectors 130, 140, 150, 160 and a corresponding one or more rivet nuts configured to couple the at least four parts of the arc shaped base ring with each other to create a full round base ring. More specifically, the at least four connectors for base ring (4 quadrant) creates full round base ring assembly and the rivet nut is used for fixing the arc shaped base ring one on another.

The base ring assembly 10 further includes a plurality of fasteners 180 configured to affix the arc shaped base ring with L-shaped clamp. In one embodiment, the plurality of fasteners 180 may include a CSK screws and Allen screws to fix arch shaped base ring and the L-shaped clamp. As used herein, the CSK screw is precision screw which is similar to bolts as they have a head and a shank. Since they are used for the construction of machine components, they are threaded externally for the full length of the shank. Similarly, as used herein, the Allen screw also known as a socket head cap screws, are stock items at lightning bolt in many materials sizes. Most socket head cap screws are designed with a small head, followed by a smooth rod, and then threaded to the end of the screw.

Figure 2:
FIG. 2 is a schematic representation of top view and cross section view of the arc shaped base ring of the base ring assembly of FIG. 1 in accordance with an embodiment of the present disclosure.
Figure 2:
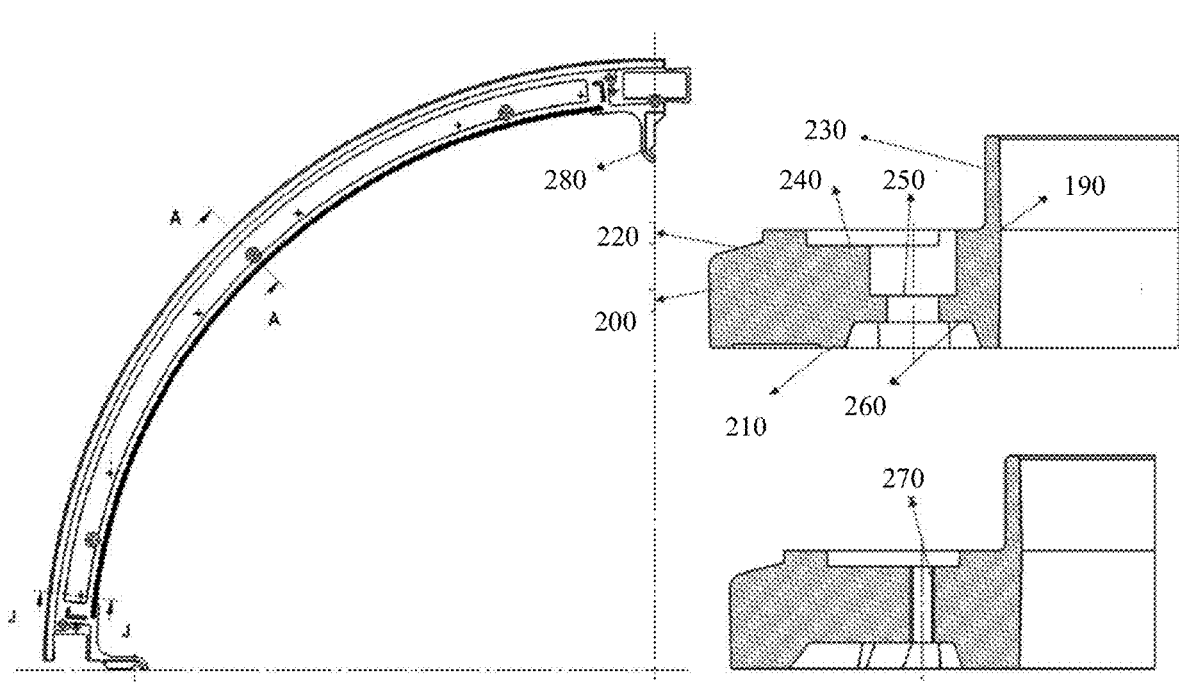

FIG. 2 is a schematic representation of top view and cross section view of the arc shaped base ring of the base ring assembly 10 of FIG. 1 in accordance with an embodiment of the present disclosure. The arc shaped base ring 20 includes surface of inner diameter 190 of the arc shape base ring, surface of outer diameter 200 of the arc shape base ring. In one embodiment, the inner diameter 190 is greater than the outer diameter 200. The arc shape base ring also includes a surface of bottom portion 210 of the arc shape base ring. The arc shaped base ring includes a surface 220 adjacent to outer diameter, where the surface is located for outer band ring connected with two base rings. The arc shaped base ring includes a surface of rubber beading inner side 230 and a surface of L-shaped clamp 240. The arc shaped base ring includes a plurality of drill hole 250 of Allen screw of the plurality of fasteners for fixing center guide locator 260. The arc shaped base ring also includes a tapped hole 270 for CSK screw of the plurality of fasteners by fixing L-shaped clamp. The arc shape base ring further includes an insert guide 280 configured to be coupled with an aluminum vertical pillar.

Figure 3:
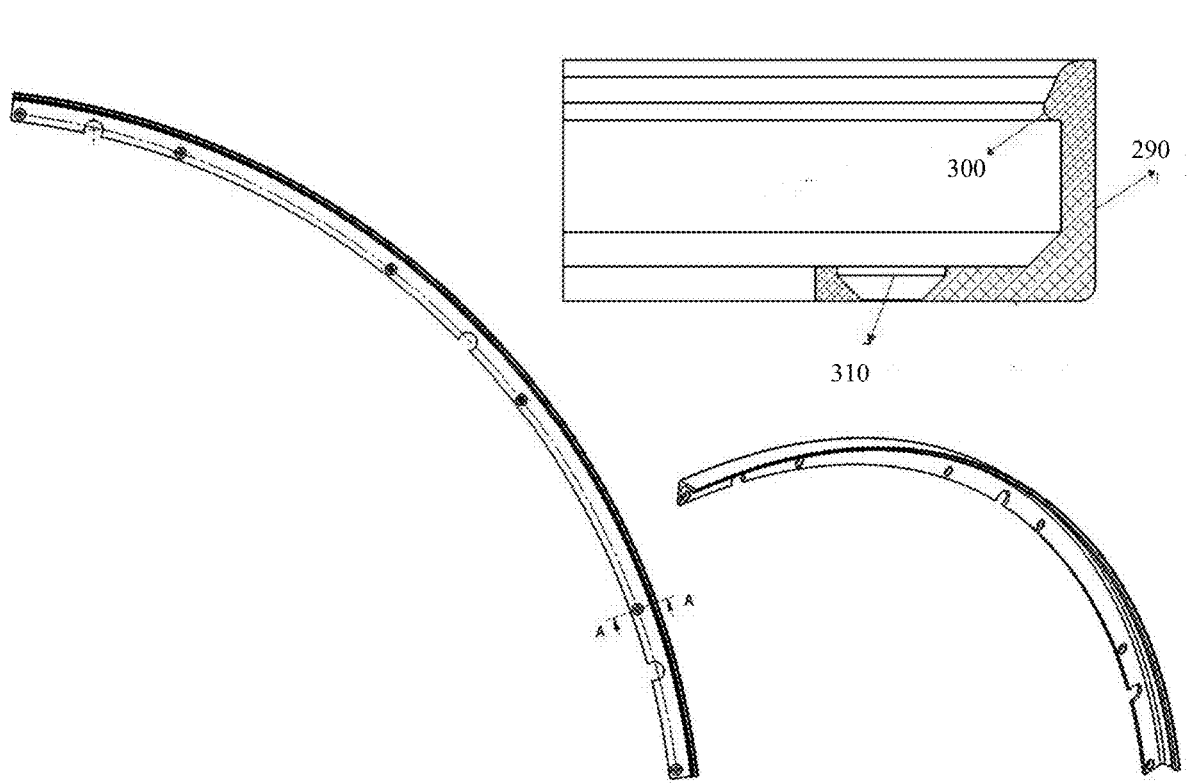
FIG. 3 is a schematic representation of a top view and cross section view of arc shaped L clamp of FIG. 1 in accordance with an embodiment of the present disclosure.

FIG. 3 is a schematic representation of a top view and cross section view of arc shaped L clamp 70 of FIG. 1 in accordance with an embodiment of the present disclosure. The L-shaped clamp 70 includes an outer diameter 290, a rubber beading locking portion 300 and a hole 310 for a countersunk screw of the plurality of fasteners for affixing with the arc shape base ring. As used herein, the countersunk screw is a type of screw which is designed to rest flush with the object or surface in which it is inserted. They are called "countersunk screws" because they "sink" into objects and surfaces. They feature a flat head that tapers along the shaft.

Figure 4:
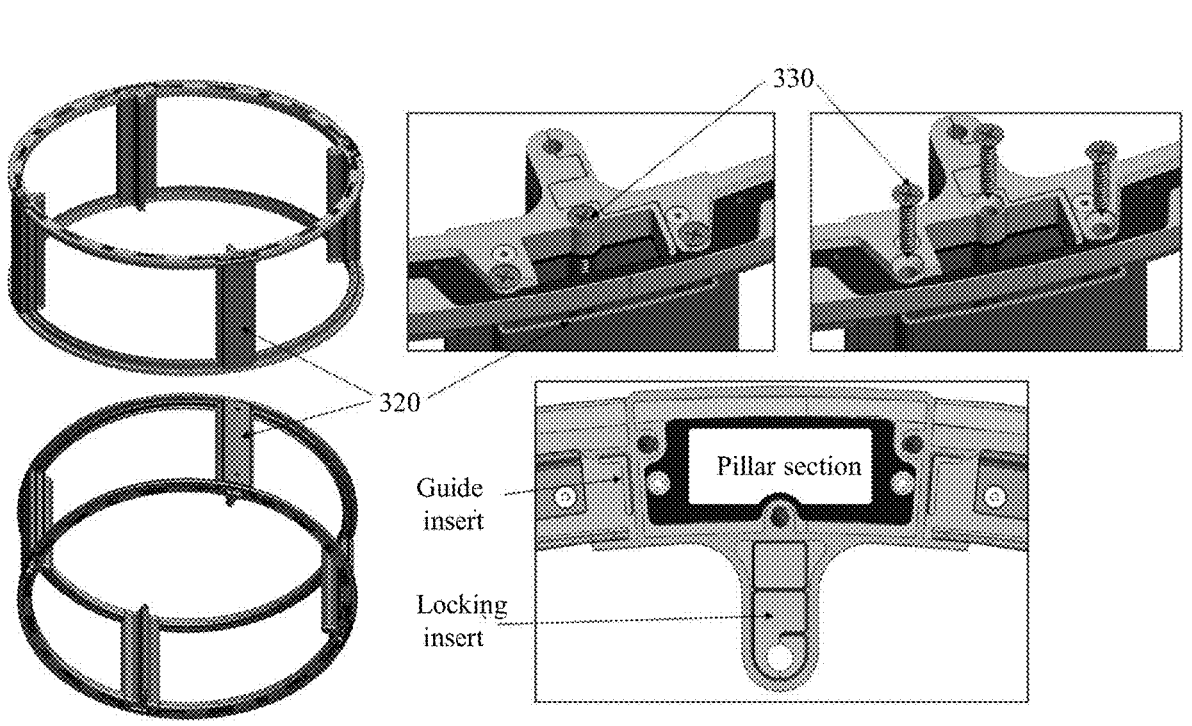
FIG. 4 is a schematic representation of an isometric view and cross section view of arc shape base ring with aluminum vertical pillar in accordance with an embodiment of the present disclosure.
Figure 5:
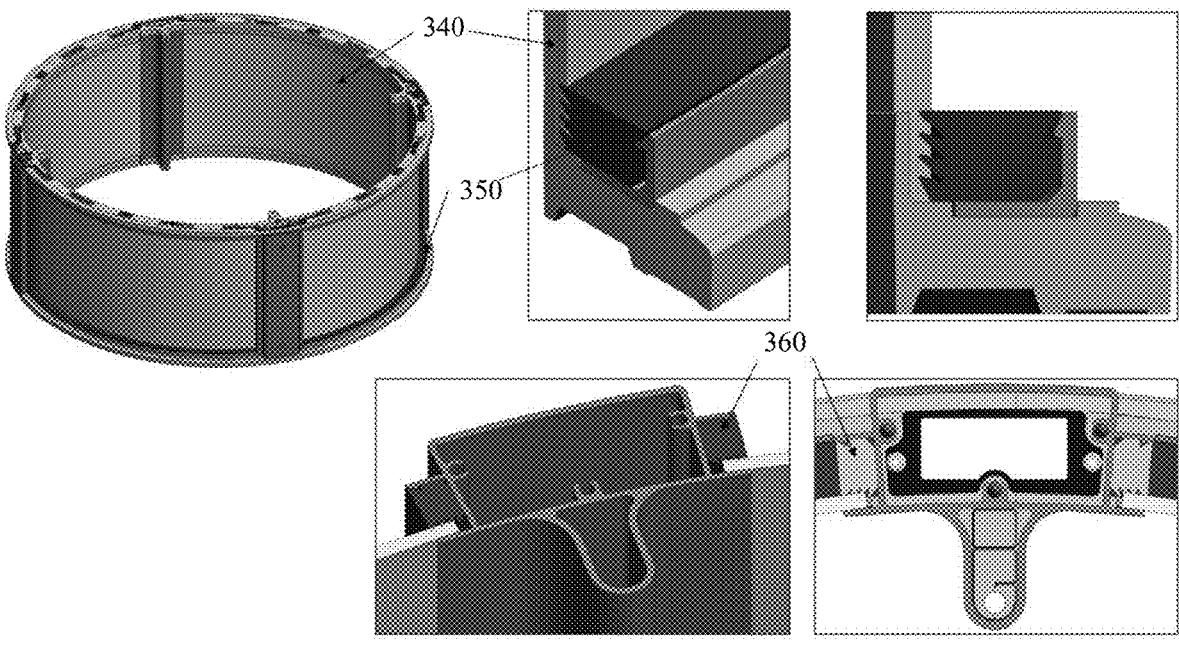
FIG. 5 is a schematic representation of one embodiment of the base ring assembly of FIG. 1, depicting an isometric view a cross section view of arc shape base ring with a polycarbonate sheet and a rubber beading in accordance with an embodiment of the present disclosure.

FIG. 4 is a schematic representation of an isometric view and cross section view of arc shape base ring 20 with aluminum vertical pillar in accordance with an embodiment of the present disclosure. The arc shaped base ring is fixed with an aluminum vertical pillar 320 using at least three CSK self-thread screw 330 and a guide insert is used for arresting the movement of the aluminum vertical pillar and locking insert for the external cylinder assembly connecting purpose one and above. FIG. 5 is a schematic representation of one embodiment of the base ring assembly of FIG. 1, depicting an isometric view a cross section view of arc shape base ring with a polycarbonate sheet 340 and a rubber beading in accordance with an embodiment of the present disclosure. The polycarbonate sheet is placed and covers the external cylinder assembly which is guided in groove of the arc shaped base ring with support of the aluminum vertical pillar. The rubber lock includes a first rubber lock 350 and a second rubber lock 360. The first rubber lock is compressed with polycarbonate sheet along with the arc shaped base ring and the second rubber lock is compressed with polycarbonate sheet along with aluminum vertical pillar.

Figure 6:
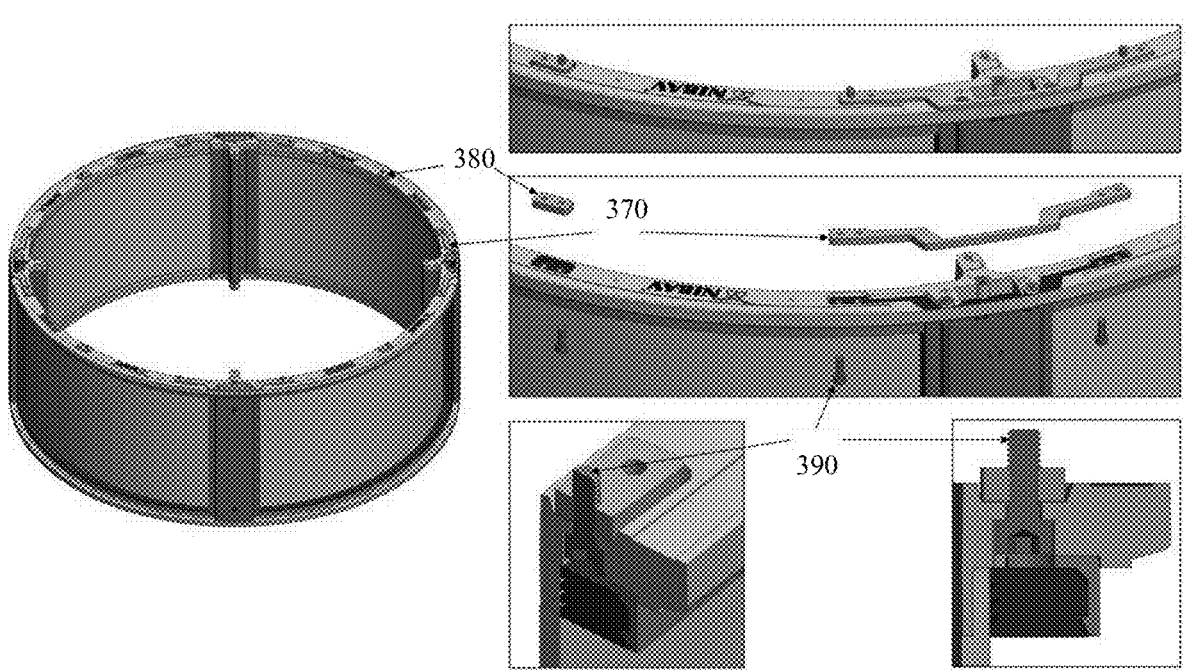
FIG. 6 is a schematic representation of one embodiment of the base ring assembly of FIG. 1, depicting an isometric view and a cross section view of the arc shaped base ring with a center guide locator and a middle guide locator in accordance with an embodiment of the present disclosure.

FIG. 6 is a schematic representation of one embodiment of the base ring assembly of FIG. 1, depicting an isometric view and a cross section view of the arc shaped base ring with a center guide locator 370 and a middle guide locator 380 in accordance with an embodiment of the present disclosure. The center guide locator 370 is fixed on the arc shaped base ring with the help of at least two Allen screws 390 from the plurality of fasteners. The middle guide locator 380 is fixed on the arc shaped base ring with the help of at least two Allen screws 390 from the plurality of fasteners. Similarly, same center guide locator 370 and the middle guide locator 380 are fixed on four places on the one full round base ring. The center guide locator and the middle guide locator are used for perfect lock and alignment between two cylinder one and above.

Figure 7:
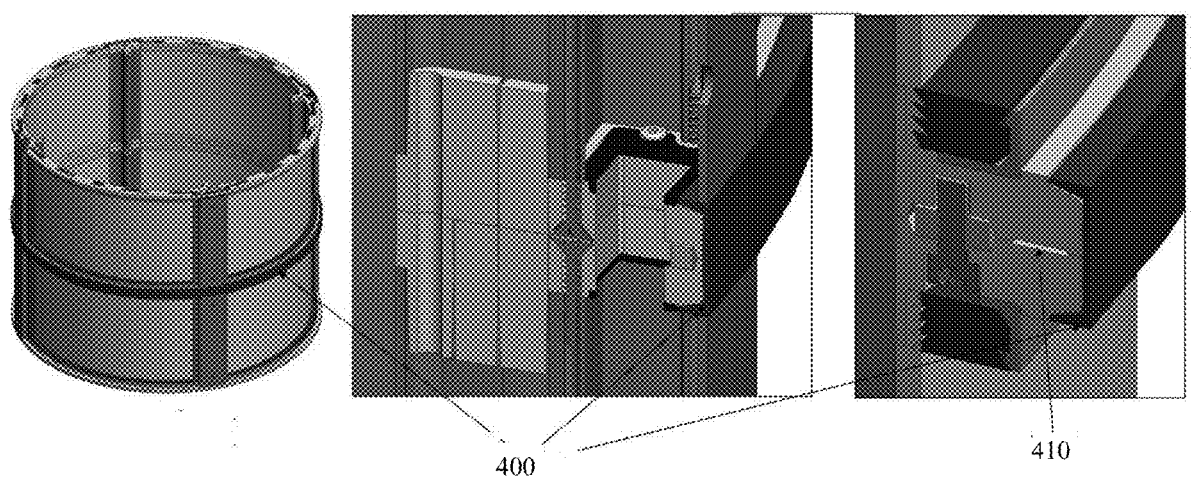
FIG. 7 is a schematic representation of another embodiment of the base ring assembly of FIG. 1, depicting an isometric view and a cross section view of the arc shaped base ring with band ring of two cylinder assembly in accordance with an embodiment of the present disclosure.

FIG. 7 is a schematic representation of another embodiment of the base ring assembly 10 of FIG. 1, depicting an isometric view and a cross section view of the arc shaped base ring 20 with band ring of two cylinder assembly in accordance with an embodiment of the present disclosure. The band outer ring 400 is connected between two external cylinder assembly and for rigidity of each cylinder connecting assembly. The band outer ring should additionally lock support between two external cylinder assembly. The groove is used for placing a rubber strip 410 which is air locked between two external cylinder assemblies.

Figure 8:
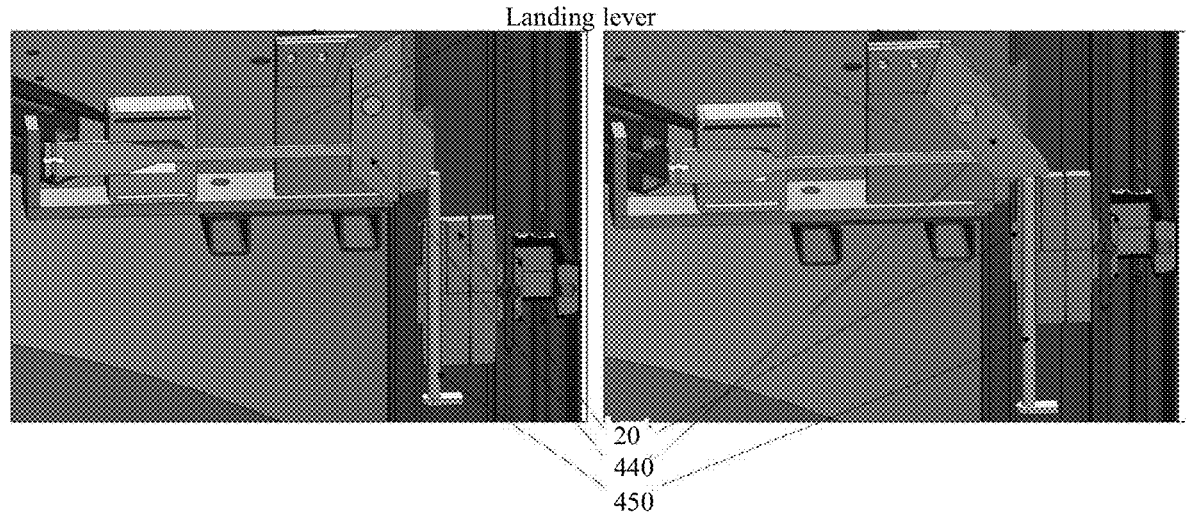
FIG. 8 is a schematic representation of yet another embodiment of the base ring assembly of FIG. 1, depicting two cross section view of the arc shape base ring with landing lever functional view in accordance with an embodiment of the present disclosure.

FIG. 8 is a schematic representation of yet another embodiment of the base ring assembly 10 of FIG. 1, depicting two cross section view of the arc shape base ring 20 with landing lever functional 430 view in accordance with an embodiment of the present disclosure. If the cabin landed at floor level a lock plate 440 is rested on the projection surface which is added in the arc shape base ring. The connecting rod 450 is touching with the lock plate 440 and guide inside the base ring assembly which is linked with door lock assembly.

Figure 9:
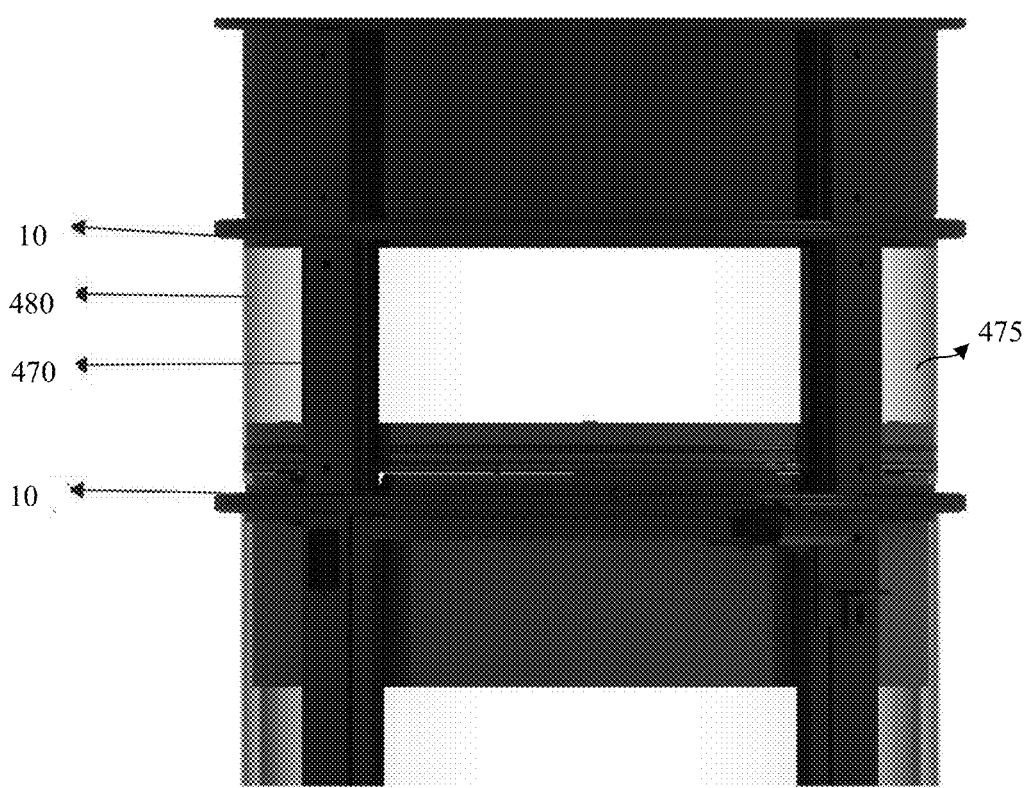
FIG. 9 is a schematic representation of pneumatic vacuum elevator with the base ring assembly in accordance with an embodiment of the present disclosure.

FIG. 9 is a schematic representation of pneumatic vacuum elevator 460 with the base ring assembly in accordance with an embodiment of the present disclosure. The elevator includes an external cylinder assembly 470 comprising an elevator cabin 475 inserted therein. The elevator also includes a polycarbonate sheet 480 configured to cover the external cylinder assembly. The elevator also includes a base ring assembly 10 mechanically coupled to the polycarbonate sheet. The base ring assembly 10 is configured to assist resting another external cylinder assembly one and above. The base ring assembly comprises an arc shaped base ring comprises at least four parts. The arc shaped base ring is composed by an aluminum die casting. The base ring assembly includes an L-shaped clamp comprises at least four parts. The at least four parts of the L-shaped clamp are located on grooves of the corresponding at least four parts of the arc shaped base ring. The L-shaped clamp is configured to hold a rubber beading rib of an external cylinder assembly. The base ring assembly further includes at least four connectors and a corresponding one or more rivet nuts configured to couple the at least four parts of the arc shaped base ring with each other to create a full round base ring. The base ring assembly also includes a plurality of fasteners configured to affix the arc shaped base ring with L-shaped clamp.

FIG. 10 is a flow chart representing the steps involved in a method 500 to assemble the base ring assembly in accordance with an embodiment of the present disclosure. The method 500 includes forming an arc shaped base ring by an aluminum die casting, where the arc shaped base ring includes at least four parts in step 510. In one embodiment, the arc shaped base ring includes an inner diameter, an outer diameter and a bottom portion, where the inner diameter is greater than the outer diameter. In a specific embodiment, the arc shaped base ring includes a surface adjacent to outer diameter, where the surface is located for outer band ring connected with two base rings. In some embodiments, the arc shaped base ring includes a plurality of drill hole of Allen screw of the plurality of fasteners for fixing center guide locator. In such an embodiment, the arc shaped base ring includes a tapped hole for CSK screw of the plurality of fasteners by fixing L-shaped clamp. In one embodiment, the arc shaped base ring includes an insert guide configured to be coupled with an aluminum vertical pillar.

The method 500 also includes locating an L-shaped clamp on grooves of the arc shaped base ring, where the L-shaped clamp includes at least four parts, where the L-shaped clamp is configured to hold a rubber beading rib of an external cylinder assembly in step 520. In one embodiment, the L-shaped clamp includes an outer diameter, a rubber beading locking portion and a hole for countersunk screw of the plurality of fasteners for affixing with the arc shape base ring. The method 500 further includes coupling the at least four parts of the arc shaped base ring with each other using at least four connectors and a corresponding one or more rivet nuts to create a full round base ring in step 530. In one embodiment, the arc shaped base ring is fixed with an aluminum vertical pillar using at least three CSK self-thread screw and a guide insert is used for arresting the movement of the aluminum vertical pillar and locking insert for the external cylinder assembly connecting purpose one and above. In such an embodiment, the grooves of the arc shaped base ring with support of aluminum vertical pillar are configured to guide a polycarbonate sheet and covers the external cylinder assembly.

The method 500 further includes affixing the arc shaped base ring with L-shaped clamp using a plurality of fasteners in step 540. In one embodiment, the arc shaped base ring along with the polycarbonate sheet is configured to compress a first rubber lock and the polycarbonate sheet along with the aluminum vertical pillar is configured to compress a second rubber lock. In a specific embodiment, the arc shaped base ring is fixed with a center guide locator and a middle guide locator using corresponding at least two Allen screw of the plurality of fasteners.

Various embodiments of the base ring assembly as described above enables an elevator guide pillar system includes an elevator external cylinder having base ring which connects the top and bottom of the pillar. The polycarbonate sheet is rested on groove on top and bottom side of the base ring which is placed on four side of external cylinder for 360-degree visibility from inside of cabin while riding condition. This weight of the arc shape base ring is very minimal for handling process while installation and loading-unloading process. The aluminum die casting process is developed by single arc shape geometry.

The assembly provides additional guide rib without any movement on aluminum vertical pillar. The assembly includes a L clamp with the arc shape geometry and assembled with base ring using CSK screws. The assembly provides guide insert for pillar fixing along with arc shaped base ring part. The cylinder alignment (cylinder one and above) is improved better than existing method. The aluminum vertical pillar resting surface should be flattened on the arc shaped base ring. The Landing lever connecting pin is inserted at hole which is provided in the arc shaped base ring.

Furthermore, there is no intention to be bound by any expressed or implied theory presented in the preceding technical field, background, brief summary or the detailed description. It is also to be understood that the specific devices and processes illustrated in the attached drawings, and described in the specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method 250 in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A base ring assembly for a pneumatic vacuum elevator comprising:

an arc shaped base ring comprises at least four parts, wherein the arc shaped base ring is composed by an aluminum die casting;

an L-shaped clamp comprises at least four parts, wherein the at least four parts of the L-shaped clamp are located on grooves of the corresponding at least four parts of the arc shaped base ring, wherein the L-shaped clamp is configured to hold a rubber beading rib of an external cylinder assembly;

at least four connectors and a corresponding one or more rivet nuts configured to couple the at least four parts of the arc shaped base ring with each other to create a full round base ring; and a plurality of fasteners configured to affix the arc shaped base ring with L-shaped clamp.

2. The assembly as claimed in claim 1, wherein the arc shaped base ring comprises an inner diameter, an outer diameter and a bottom portion, wherein the inner diameter has a height that is greater than a height of the outer diameter.

3. The assembly as claimed in claim 1, wherein the arc shaped base ring comprises a surface adjacent to outer diameter, wherein the surface is located for outer band ring connected with two base rings.

4. The assembly as claimed in claim 1, wherein the arc shaped base ring comprises: a plurality of drill holes for receiving Allen screws of the plurality of fasteners for fixing a center guide locator; a tapped hole for receiving a screw of the plurality of fasteners for fixing the L-shaped clamp; and an insert guide configured to be coupled with an aluminum vertical pillar.

5. The assembly as claimed in claim 1, wherein the L-shaped clamp comprises an outer diameter, a rubber beading locking portion and a hole for countersunk screw of the plurality of fasteners for affixing with the arc shape base ring.

6. The assembly as claimed in claim 1, wherein the arc shaped base ring is fixed with an aluminum vertical pillar using at least three self-thread screws and a guide insert is used for arresting the movement of the aluminum vertical pillar and a locking insert for the external cylinder assembly.

7. The assembly as claimed in claim 1, wherein the grooves of the arc shaped base ring with support of an aluminum vertical pillar is configured to guide a polycarbonate sheet and covers the external cylinder assembly.

8. The assembly as claimed in claim 1, wherein the arc shaped base ring along with a polycarbonate sheet is configured to compress a first rubber lock and the polycarbonate sheet along with an aluminum vertical pillar is configured to compress a second rubber lock.

9. The assembly as claimed in claim 1, wherein the arc shaped base ring is fixed with a center guide locator and a middle guide locator using corresponding at least two Allen screws of the plurality of fasteners.

10. A method for forming a base ring assembly for a pneumatic vacuum elevator comprising:

forming an arc shaped base ring by an aluminum die casting, wherein the arc shaped base ring comprises at least four parts;

locating an L-shaped clamp on grooves of the arc shaped base ring, wherein the L-shaped clamp comprises at least four parts, wherein the L-shaped clamp is config- ured to hold a rubber beading rib of an external cylinder assembly;

coupling the at least four parts of the arc shaped base ring with each other using at least four connectors and a corresponding one or more rivet nuts to create a full round base ring; and affixing the arc shaped base ring with L-shaped clamp using a plurality of fasteners.

11. A pneumatic vacuum elevator comprising:

an external cylinder assembly comprising an elevator cabin inserted therein;

a polycarbonate sheet configured to cover the external cylinder assembly; and a base ring assembly mechanically coupled to the poly- carbonate sheet, wherein the base ring assembly is configured to assist resting another external cylinder assembly on and above, wherein the base ring assembly comprises:

an arc shaped base ring comprises at least four parts, wherein the arc shaped base ring is composed by an aluminum die casting;

an L-shaped clamp comprises at least four parts, wherein the at least four parts of the L-shaped clamp are located on grooves of the corresponding at least four parts of the arc shaped base ring, wherein the L-shaped clamp is configured to hold a rubber beading rib of an external cylinder assembly;

at least four connectors and a corresponding one or more rivet nuts configured to couple the at least four parts of the arc shaped base ring with each other to create a full round base ring; and a plurality of fasteners configured to affix the arc shaped base ring with L-shaped clamp.

* * * * *